United States Patent
Ji

(10) Patent No.: US 9,459,702 B2
(45) Date of Patent: Oct. 4, 2016

(54) PORTABLE TERMINAL FOR INPUTTING THREE SIGNALS VIA ONE INPUT KEY, AND TEXT INPUT METHOD USING SAME

(76) Inventor: Song Hak Ji, Seoul (KR)

(*) Notice: Subject to any disclaimer, the term of this patent is extended or adjusted under 35 U.S.C. 154(b) by 179 days.

(21) Appl. No.: 13/583,955

(22) PCT Filed: Mar. 11, 2010

(86) PCT No.: PCT/KR2010/001533
§ 371 (c)(1),
(2), (4) Date: Nov. 21, 2012

(87) PCT Pub. No.: WO2011/111887
PCT Pub. Date: Sep. 15, 2011

(65) Prior Publication Data
US 2013/0169544 A1   Jul. 4, 2013

(51) Int. Cl.
*G06F 3/02* (2006.01)
*G06F 3/023* (2006.01)
*G06F 3/041* (2006.01)
*G06F 3/0488* (2013.01)
*H04M 1/23* (2006.01)

(52) U.S. Cl.
CPC ............ *G06F 3/023* (2013.01); *G06F 3/0233* (2013.01); *G06F 3/041* (2013.01); *G06F 3/04883* (2013.01); *H04M 1/23* (2013.01); *G06F 2203/04104* (2013.01); *H04M 2250/70* (2013.01)

(58) Field of Classification Search
CPC ...... G06F 3/023; G06F 3/041; G06F 3/0233; G06F 3/04883; G06F 2203/04104; H04M 1/23; H04M 2250/70
USPC ............ 178/18.01–19.07; 341/22–35; 345/168–178; 361/679.08–679.2
See application file for complete search history.

(56) References Cited

U.S. PATENT DOCUMENTS 5,528,235 A   6/1996  Lin et al.
7,265,745 B1 *  9/2007  Kling ............................ 345/169

(Continued)

FOREIGN PATENT DOCUMENTS

EP         1 936 476 A1    6/2008
KR    10-2007-0050306 A    5/2007

(Continued)

OTHER PUBLICATIONS

International Search Report dated Dec. 7, 2010, from corresponding International Patent Application No. PCT/KR2010/001533 and its English translation—4 pages.

(Continued)

*Primary Examiner* — Michael Pervan
*Assistant Examiner* — Andrew Lee
(74) *Attorney, Agent, or Firm* — Maier & Maier, PLLC

(57) ABSTRACT

According to the present invention a portable input terminal may be described. The input terminal may permit inputting letters in a portable terminal, letters that may be inputted more quickly than in conventional inventions because the present invention is set in a way that three different letters, numbers or symbols can be inputted by pressing one input key one time. Three letters, numbers or symbols may be inputted through one key and a plurality of sensors may be arranged effectively. The inputting accuracy significantly improves over the prior art, avoiding inputting errors by applying and developing various kinds of inputting ways using all characteristics of the present invention.

3 Claims, 5 Drawing Sheets

(56) References Cited

U.S. PATENT DOCUMENTS

| | | |
|---|---|---|
| 8,576,177 B2 * | 11/2013 | Westerman et al. .......... 345/173 |
| 2005/0052431 A1 * | 3/2005 | Chang ........................... 345/173 |
| 2005/0200609 A1 * | 9/2005 | Van der Hoeven ........... 345/169 |
| 2008/0001926 A1 * | 1/2008 | XiaoPing et al. ............. 345/173 |
| 2009/0128374 A1 * | 5/2009 | Reynolds et al. .............. 341/33 |
| 2010/0115448 A1 * | 5/2010 | Lysytskyy ........... G06F 3/04886 715/773 |
| 2010/0282524 A1 * | 11/2010 | Linotte et al. ............. 178/18.01 |
| 2011/0083104 A1 * | 4/2011 | Minton ........................ 345/173 |

FOREIGN PATENT DOCUMENTS

| | | |
|---|---|---|
| KR | 10-0768269 B1 | 10/2007 |
| KR | 10-0888817 B1 | 3/2009 |
| WO | 02/095524 A2 | 11/2002 |
| WO | WO 2009007081 A1 * | 1/2009 |

OTHER PUBLICATIONS

Decision of Registration dated Aug. 31, 2011, from corresponding International Patent Application No. PCT/KR2010/001533, filed Mar. 11, 2011 (No English translation).

Korean Office Action dated Jun. 27, 2011 (No English translation).

* cited by examiner

PORTABLE TERMINAL FOR INPUTTING THREE SIGNALS VIA ONE INPUT KEY, AND TEXT INPUT METHOD USING SAME

RELATED APPLICATIONS

This is the U.S. national stage application which claims priority under 35 U.S.C. §371 to International Patent Application No.: PCT/KR2010/001533filed on Mar. 11, 2010, the disclosure of which is incorporated by reference herein its entirety.

BACKGROUND OF THE INVENTION

1. Field of the Invention

The present invention relates to a portable terminal for inputting three signals via one input key and text input method, and more particularly to the small-sized portable terminal that can input letter quickly and significantly increase accuracy of inputting letter resulting from the configuration of the present invention that can input three different signal such as letter, number or symbol by pressing one key one time.

2. Description of the Related Art

As the mobile communications technology developed significantly, activities such as email, the Internet, online chat, business order and approval from bank and stock market, etc are carried out in mobile phones, smart phones, PDAs (Personal Digital Assistant), etc, which leads to great demands for inputting letter convenience in portable terminals.

However, keypad of mobile electronic devices such as mobile phones or PDAs are small-sized, and thus have a difficulty of having sufficient number of buttons that correspond to all letter, and so the keypad of the small-sized mobile electronic devices have the configuration where all letter of certain language are inputted by using a limited number of the buttons. Therefore, the users had to press the limited number of the buttons many times to input one letter when using the keypad, which led to a significant reduction in input speed.

When many letter are allocated to one button, the user has to press the button at least three times to input the letter that the user wants to input, and also has to stop inputting for a while or makes the condition for new letter to be inputted by pressing the next direction keys in case of inputting the same letter or inputting the letter that correspond to the button in a row.

Besides, the users have to have some time for adapting to new mobile phones, and children and senior citizens who are unfamiliar with using the portable terminal device have more difficulty of adapting because most of current mobile terminal devices which the user has to press various buttons for one letter have different inputting key orders and methods. In order to avoid the problem, the users inevitably have to use the portable terminal devices from the same company and this leads to the problem of the narrow choice range of the mobile terminal devices.

In this regards, reflecting on the current times when the activity of letter inputting is getting larger and important, different inputting method that solves the problem of the reduction in the speed and accuracy when using the traditional letter inputting method and anyone can use it simply and intuitionally is required.

DETAILED DESCRIPTION OF THE INVENTION

The present invention is intended to solve the conventional problem and provide the mobile terminal devices which can input letter far more quickly than the conventional arts and method for inputting letter by using the present invention. This is achieved by the present invention configuration in which the user can input three different signals such as letter, number or symbol by pressing one key one time.

Also, in the present invention, there are two advantages of three different signals such as letter, number or symbol is being inputted through one key and various sensors are arranged effectively. Mobile terminal devices that significantly increased the accuracy avoiding inputting errors and letter inputting method by using the present invention is provided by developing and applying various inputting methods by using the above two advantages.

Unlike the conventional arts, the inputting method of the present invention is an intuitive method for inputting three different signals such as letter, number or symbol by one key without additional change keys. Therefore, anyone can adapt to the present invention and more convenient mobile terminal device and method for inputting letter by using the present invention are provided.

In accordance with the present invention of a mobile terminal capable of inputting three signals by one input key to achieve the purposes above, example 1 comprises at least one input key and a plurality of sensors sensing electrical signals positioned below the input key, wherein signal values are allocated to the sensors respectively and the input key inputs three different letter, number or symbol by pressing the input key one time by the sensors allocated with the signal values.

Example 2 of the mobile terminal capable of inputting three signals by one input key according to example 1, wherein at least one sensor positioned in the center below the input key is set as a reference sensor unit, different signal values are respectively allocated to the reference sensor unit, left sensor unit which is on the left side of the reference sensor unit and right sensor unit which is on the right side of the reference sensor unit, and the left sensor unit and the right sensor unit include a plurality of sensors.

Besides, example 3 of the mobile terminal capable of inputting three signals by one input key according to example 2, wherein signal values allocated to the left sensor unit and the right sensor unit are given a weighted value as the distance from the reference sensor unit gets farther, the weighted value increases the possibility that letter, number or symbol allocated to the left sensor unit or the right sensor unit is inputted, the signal values are numbers, the weighted values are what are further added to the numbers, total sum of the signal values allocated to sensors pressed by users determine which letter, number or symbol allocated to the left sensor unit, the reference sensor unit or the right sensor unit is inputted, letter, number or symbol allocated to the reference sensor unit is inputted if the total sum is within user predetermined range, and letter, number or symbol allocated to the left sensor unit or the right sensor unit are inputted respectively if the total sum is outside the user predetermined range.

Example 4 of the mobile terminal capable of inputting three signals by one input key according to example 2, the reference sensor unit comprises at least one of the left sensor unit or the right sensor unit which are adjacent to the reference unit.

Example 5 of the mobile terminal capable of inputting three signals by one input key comprises at least one input key, a plurality of sensors sensing electrical signals positioned below the input key, wherein the center of the input key is set as a reference point, and based on the reference point the left side of the reference point is set as a first area and the right side of the reference point is set as a second area, letter, number and symbol is inputted by at least one way of (1) removing pressing on the pressed area and the area which is different from the pressed area, (2) removing pressing on either the first area or the second area after pressing the first area and the second area at the same time, or (3) removing pressing on the pressed area after pressing at least one area of the first area or the second area.

When using the way (1), letter, number or symbol allocated to the area where pressing is removed is inputted. When using the way (2), letter, number or symbol allocated to area where pressing is removed is inputted. When using the way (3), allocated letter, number or symbol from letter, number or symbol different from what is allocated to the way (1) and the way (2) is inputted.

Example 6 comprises at least one input key, a plurality of sensors sensing electrical signals positioned below the input key, wherein a position of the input key pressed for the first time is set as the first reference point; based on the first reference point, the second reference points are set on the left and right side; area A is between the reference points 2, the left side of the area A is set as an area B, and the right side of the area A is set as an area C, letter, number and symbol is inputted by at least one way of (1) pressing the area A, (2) moving to the area B pressing the area A, or (3) moving to the area C pressing the area A.

Here, when using the way (1), letter, number or symbol allocated to the area A is inputted. When using the way (2), letter, number or symbol allocated to the area B is inputted. When using the way (3), letter, number or symbol allocated to the area C is inputted.

In accordance with from example 1 to example 6, upper part of the input key is made of elastic material and the elastic material is polyurethane or silicon.

Next, example 1 of the present invention of a mobile terminal capable of inputting three signals by one input key comprises, in accordance with a method for inputting three signals of mobile terminal having at least one input key capable of inputting three signals, comprises a partitioning area into the first area which is on the left side of a reference point and the second area which is on the right side of the reference point, the reference point is on the center of the input key; a inputting letter, number or symbol by one way of inputting (1) removing pressing on pressed area and the area which is different from the pressed area after pressing one of the first area or the second area, (2) removing pressing on either the first area and the second area after pressing the first area and the second area at the same time, or (3) removing pressing on pressed area after pressing at least one of the first area and the second area.

When inputting using the way (1), letter, number or symbol allocated to the area where pressing is removed are inputted. When inputting using the way (2), letter, number or symbol allocated to the area where pressing is removed is inputted. When inputting using the way (3), letter, number or symbol from letter, number or symbol different from what is allocated to the way (1) and the way (2) is inputted.

Example 2, in accordance with the method for inputting letter of mobile terminal having at least one input key capable of inputting three signals, comprises a setting the first reference point and the second reference points, the first reference point is the place where the input key is pressed first, the second reference points are on the left and right side of the first reference point; a partitioning area into Area A which is between the second reference points, Area B which is on the left side of the Area A and Area C which is on the right side of the Area A; a inputting letter, number or symbol by one way of letter inputting (1) moving to the Area B pressing the Area A, letter inputting (2) moving to the Area C pressing the Area A, or letter inputting (3) pressing the Area A.

In accordance with the letter inputting, when using the letter inputting (1), letter, number or symbol allocated to the area B is inputted. In accordance with the letter inputting, when using the letter inputting (2), letter, number or symbol allocated to the area C is inputted. In accordance with the letter inputting, when using the letter inputting (3), letter, number or symbol allocated to the area A is inputted.

In accordance with the present invention of portable terminal devices that can input three signals by one input key and letter inputting method by using the present invention, the present invention is constituted to be able to input three different letter, number or signals by pressing one key one time. Therefore, the present invention has the advantage of being able to input letter more quickly than the conventional arts.

The present invention has the advantage of significant increase in accuracy avoiding inputting errors by developing and applying various inputting methods by using the present invention where three different letter, number or symbol can be inputted by one key and various sensors are effectively arranged.

Besides, compared to the conventional arts, the present invention method is the intuitive inputting method that can input three letter, number or symbol by pressing one key one time without additional change keys, so anyone can apply the present invention readily and the present invention has the advantage of increase in the convenience unlike the conventional arts.

DETAILED DESCRIPTION OF THE EMBODIMENTS

In accordance with the present invention of a portable terminal capable of inputting three signals by one input key and letter inputting method by using the present invention, preferable mode of the present invention is described in detail in reference to the attached drawings. The present invention can be understood better with the help of the examples below. The examples are aimed to exemplify and not intended to limit the protection scope limited by the scope of the attached claims.

Figure 1:
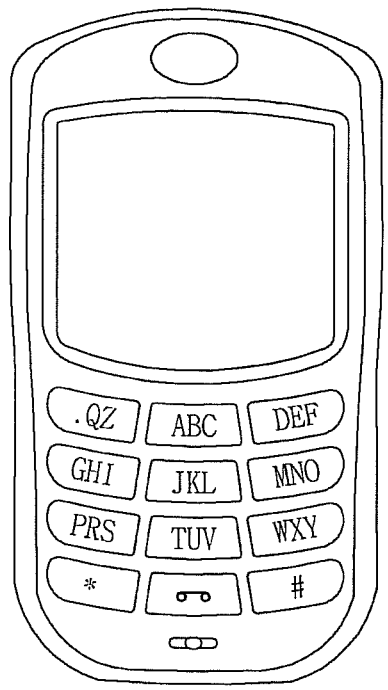
FIG. 1 shows a front view of a portable terminal of the present invention.
Figure 2:
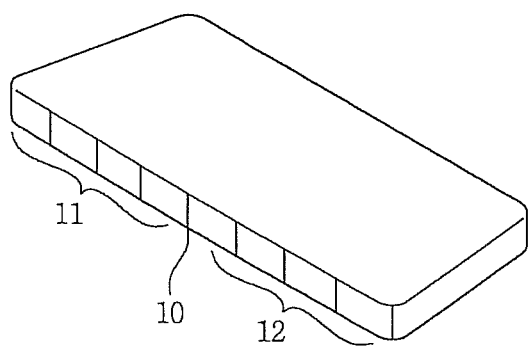
FIG. 2 shows an input key of example 2 of a portable terminal of the present invention.

As shown in FIG. 1 and FIG. 2, example 1 of a portable terminal of the present invention comprises at least one input key; and a plurality of sensors sensing electrical signals positioned below the input key, wherein signal values are allocated to the sensors respectively and the input key inputs three different letter, number or symbol by pressing the input key one time by the sensors allocated with the signal values.

As shown in FIG. 1, in accordance with a common portable terminal, an input key includes 12 input keys, a plurality of sensors are positioned in the lower part of at least one input key unlike the conventional arts, and signal values are allocated to each sensor. Here, three different signals such as letter, number or signal can be inputted by pressing one key one time as the input key is partitioned into three parts according to the sensor distribution by the sensors with three kinds of signal values.

Also it is desirable to set the three kinds of signal values as numbers. For example, if the three signal values are set as '−1, 0, 1' the signal values determine which corresponding letter, number or symbol should be inputted depending on whether the total sum of the three signal values surpasses −1, not more than 1 but not less than −1(−1≤0≤+1), or exceeds +1. This means that when three sensors with the signal value of −1 each and one sensor with the signal value of 0 are pushed simultaneously, the total sum of signal values exceeds −1. In this process the letter allocated with the total sum of signal values −1 is able to be inputted, which means it improves inputting punctuality and prevent inputting errors in the invention which are designed with three keyboards sections partitioned in small input keys.

Here, the electrical signals that sensors perceive can perceive various kinds of signals such as decompression type in which pressing pushed by users' hands or pen are perceived and capacity type in which current change is perceived by users, and the most preferably it is desirable for sensors to perceive pressing, which can increase the inputting accuracy.

As shown in FIG. 2, in accordance with the example 1, the example 2 of a portable terminal of the present invention is characterize in that at least one sensor positioned in the lower center part of the input key is set as reference sensor unit (10); each different signal values are allocated to the reference sensor unit (10), a left sensor unit (11) of the reference sensor unit and a right sensor unit (12) of the reference sensor unit; the left sensor unit (11) and the right sensor unit (12) include a plurality of sensors. In the present invention, input key is set in a way that users can press both on the left and right sides of the center, which is the simple constitution and improves the inputting accuracy avoiding inputting errors.

The reference sensor unit (10) is positioned at the center of input key based on the left and right sides regardless of the upper and lower sides. This means that sensors arranged at the up and down directions at the center part are called as reference sensor (10). As reference sensor unit (10) becoming as an axis, input key is pushed on the left and right sides, and the axis can be pushed as well. Based on the reference sensor (10), sensors positioned on the left side are called as left sensor unit (11), and sensors positioned on the right side are called as right sensor unit (12).

Figure 3:
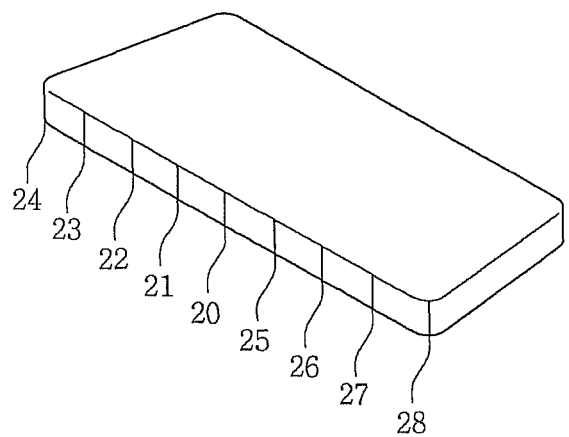
FIG. 3 shows an input key of example 3 of a portable terminal of the present invention.

As shown in FIG. 3, in accordance with example 2, an example 3 of a portable terminal of the present invention is characterize in that signal values allocated to the left sensor unit (21,22,23,24) and the right sensor unit (25,26,27,28) is added with weighted values as the distance from the reference sensor unit (20) gets farther; and the weighted values increase the possibility that letter, number or symbol allocated to left sensor unit (21,22,23,24) or right sensor unit (25,26,27,28) are inputted. Unlike example 2, this can definitely reduce the inputting errors by providing different values to each sensor according to the distance from the reference unit 20.

The weighted values are the degree of the importance provided to each value when calculating the average values, and that addition values are provided to signal values allocated to each sensor so that letter, number and symbol allocated to each sensor unit of the present invention is inputted.

In other words, it is desirable that the signal values are numbers, the weighted values are what are further added to the numbers, the number is further added, total sum of the signal values allocated to sensors pressed by users determine which letter, number or symbol allocated to the left sensor unit, the reference sensor unit or the right sensor unit is inputted, letter, number or symbol allocated to the reference sensor unit is inputted if the total sum is within user predetermined range, and letter, number or symbol allocated to the left sensor unit or the right sensor unit are inputted respectively if the total sum is outside the user predetermined range.

The detailed example is shown as below.

For example, sensors of reference sensor unit has the value "0", sensors of left sensor unit (21) has the value "−1", sensors of left sensor unit (22) has "−2", sensors of left sensor unit (23) has the value "−3", sensors of left sensor unit (24) has the value "−4", sensors of right sensor unit (25) has the value "+1", sensors of right sensor unit (26) has the value "+2", sensors of right sensor unit (27) has the value "+3" and sensors of right sensor unit (28) has the value "+4".

As weighted values are provided as the distance from reference sensor unit 20 gets farther, the possibility that letter, number or symbol allocated to left sensor unit (21, 22,23,24) or right sensor unit (25,26,27,28) are inputted increases.

This is materialized in a way that corresponding letter, number or symbol are inputted depending on whether the total sum of the three signal values surpasses −7, not more than 7 but not less than −7 (−7≤0≤+7), or exceeds +7. This range can be changed anytime to the profitable range of values fitted to the users' inputting habit by users' previous inputting. The present invention can be set in a way that the range is changed automatically to the one fitted to the user' inputting habit through programs.

In this regard, according to the example, in case that four sensors that have the signal value "−4", three sensors that have the signal value "−3" and one sensor that has the signal value "−2" are pressed, the total sum is "−27" that means "minus (−)" and therefore letter, number or symbol allocated to left sensor unit are definitely inputted.

Besides, in case that the user tries to input letter allocated to left sensor unit but end up with pressing some part of reference sensor unit together with the letter due to users' inputting in a hurry, for example, if two sensors that have the signal value "−2", four sensors that have the signal value "−2" and three sensors that have the signal value "0" are pressed, then the total sum is "−8" and letter, number and symbol allocated to left sensor unit is inputted. In the same way, also, in case that the user tries to input letter allocated to reference sensor unit, if one sensor that has the signal value "−2", three sensor that have the signal value "−1", five sensors that have the signal value "0" and two sensors that have the signal value "+1" are pressed, and then the total sum is "−4" and letter, number or symbol allocated to reference sensor unit is inputted. Letter is inputted on the right sensor unit under the same pressing principal of the left sensor unit.

By adding the weighted value, the user don't have to touch the exact spot of the sensor unit by inputting precisely differentiating which spot is on the left sensor unit or on the center sensor unit or on the right sensor unit because if the place touched by the user is more closer to the right sensor unit, the letter allocated to the right sensor unit are inputted, if it is more closer to the center, the letter allocated to the center sensor unit is inputted, and if the place is closer to the right sensor unit, the letter for the right sensor unit is inputted which decreases the possibility of inputting error significantly.

Figure 4:
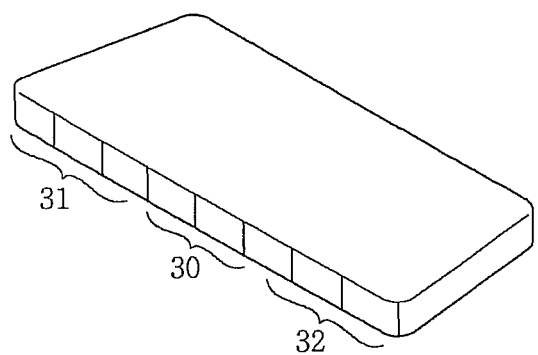
FIG. 4 shows an input key of example 4 of a portable terminal of the present invention.

As shown in FIG. 4, in accordance with an example 2, an example 4 of portable terminal of the present invention is characterized in that reference sensor unit (30) is set by including at least one of reference sensor unit (30), left sensor unit (31) adjacent to the reference sensor unit (30) or the right sensor unit (32), which is intended to improve inputting accuracy by avoiding inputting errors caused as sensors allocated to reference sensor unit are small in example 2.

In other words, unlike example 2, reference sensor unit (30) includes some of left sensor unit (31) or right sensor unit (32), which leads to the width of reference sensor unit (30) expanding like reference sensor unit (30) shown in FIG. 4. The inputting inconvenience caused by at least one scope of reference sensor unit (30), left sensor unit (31) and right sensor unit (32) being reduced could be overcome in a way of using the total sum of the allocated signal values to each sensor of example 2.

Also, a method of adding weighted values may be included in example 4 like example 3, which leads to more increase in accuracy.

Figure 5:
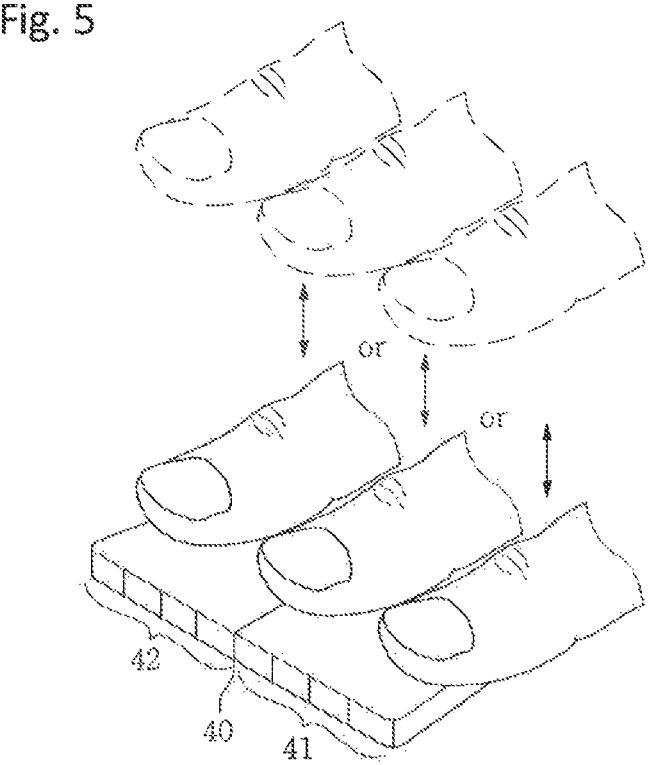
FIG. 5 shows a description view that describes the case of removing the pressing on the area of the user pressing in input key of example 5 of a portable terminal of the present invention.
Figure 6:
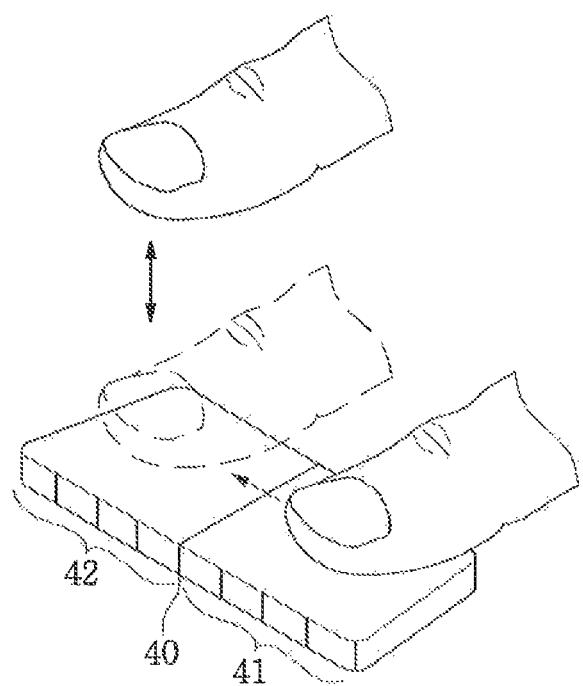
FIG. 6 shows a description view that describes the case of removing the pressing on the area of the user pressing for the first time and the area which is different from the pressed area in input key of example 5 of a portable terminal of the present invention.
Figure 7:
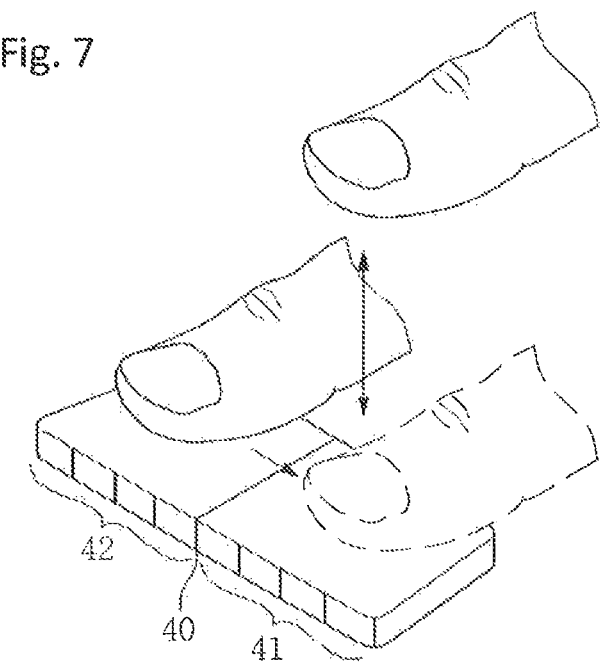
FIG. 7 shows a description view that describes the case of removing the pressing on the area of the user pressing for the first time and the area which is different from the pressed area in input key of example 5 of a portable terminal of the present invention.

Example 5 of the present invention, a portable terminal, as shown in FIGS. 5-7, comprise at least one input key, a plurality of sensors sensing electrical signals positioned below the input key, wherein the center of the input key is set as a reference point (40), and based on the reference point the left side of the reference point is set as a first area (41) and the right side of the reference point is set as a second area (42), letter, number and symbol is inputted by at least one way of (1) removing pressing on the pressed area and the area which is different from the pressed area, (2) removing pressing on either the first area or the second area after pressing the first area and the second area at the same time, or (3) removing pressing on the pressed area after pressing at least one area of the first area or the second area. When using the way (1), letter, number or symbol allocated to the area where pressing is removed are inputted. When using the way (2), letter, number or symbol allocated to area where pressing is removed is inputted. When using the way (3), allocated letter, number or symbol from letter, number or symbol different from what is allocated to the way (1) and the way (2) is inputted. This is an innovative inputting way, different from the conventional input process in which letter are inputted based on the area where pressing is removed. This process helps users may learn inputting methods easily and three letter may be inputted without inputting errors in the input key of small-sized portable terminal device.

That means, as shown in FIGS. 5-7, input key is partitioned into two areas based on the reference point (40) on the center, the left side area is set as a first area (41) and the right side area is set as a second area (42). Through the division of the area, i) in the case of taking the pressing off from the area pressed for the first time and the area which is different from the pressed area, the letter allocated to the area where pressing is removed is inputted (shown in FIG. 6 and FIG. 7), ii) in the case of taking pressing off from the one of the two areas after pressing the two areas simultaneously, the letter allocated to the area where pressing is removed is inputted and iii) in the case of removing pressing from the area pressed for the first time, different allocated letter from the i) and ii) is inputted (shown in FIG. 5).

For example if the letter 'a' is allocated for the first area, the letter 'c' for the second area, and the letter 'b' is allocated for the other input signals, to input 'a', the users press the second area for the first time, or press the first and the second area simultaneously and keep the pressing until moving the pressing point to the first area, and then remove the pressing on the first area. In order to input 'b', the users input any area of the input key and remove the pressing on the pressed area. In order to input 'c', the users press the first area for the first time, or press the first and the second area simultaneously and keep the pressing until moving the pressing point to the second area, and then remove the pressing on the second area.

Figure 8:
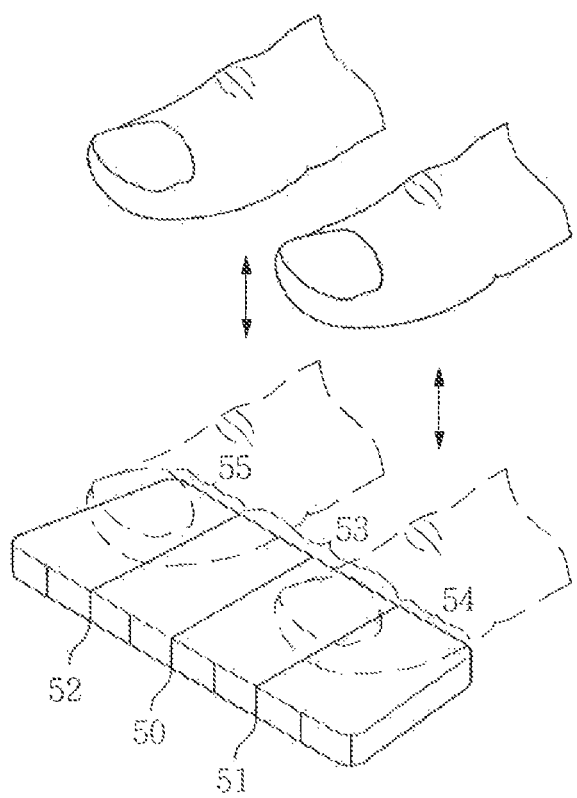
FIG. 8 shows a description view that describes the case of removing the pressing on the area where the user presses for the first time in input key of example 6 of a portable terminal of the present invention.
Figure 9:
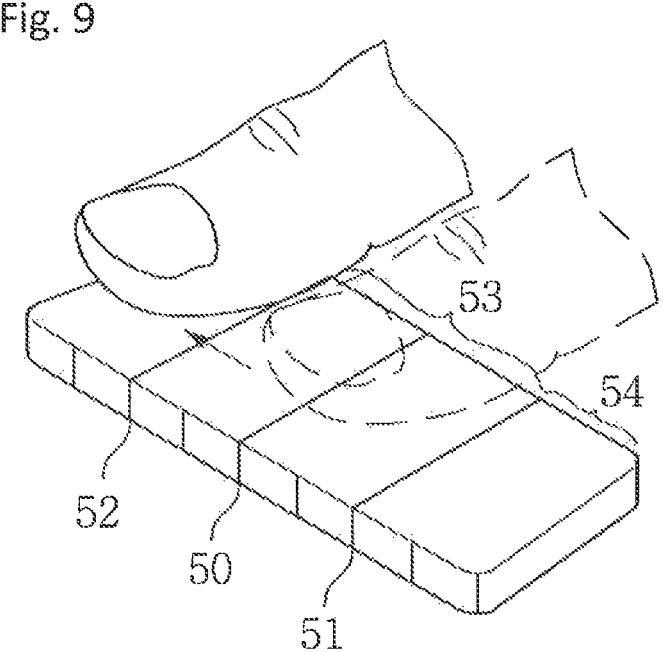
FIG. 9 shows a description view that describes the case that the user moves the pressing from the area A to the area C in input key of example 6 of a portable terminal of the present invention.
Figure 10:
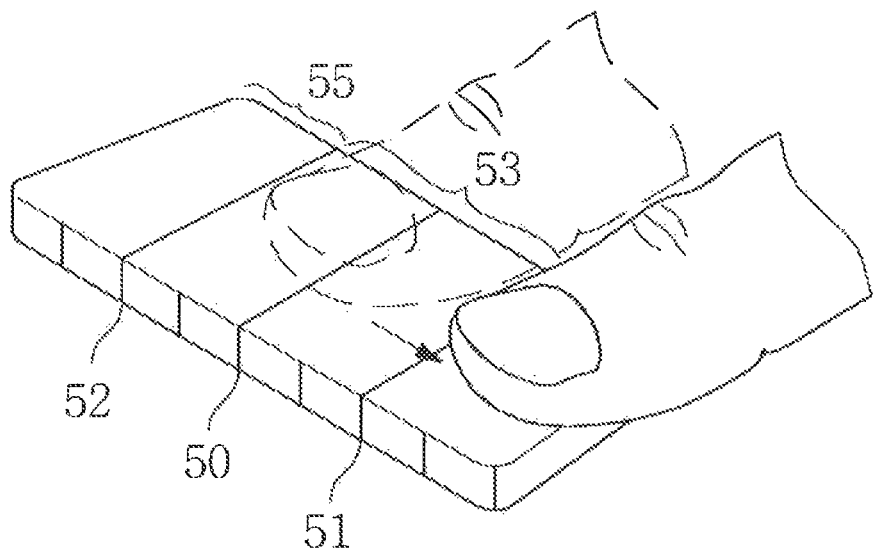
FIG. 10 shows a description view that describes the case that the user moves the pressing from the area A to the area B in input key of example 6 of a portable terminal of the present invention.

Example 6 of the invention, the portable terminal, as it is shown in the FIGS. 8-10, comprises at least one input key, on the lower part of input key, there exist a plurality of sensors sensing electric signals, the location of the pressed input key is set as the first reference point (50). Based on the first reference point (50), the second reference points (51, 52) are set on the left and right side of the reference point. Also, the gap between the two second reference points (51, 52) are partitioned into the area A (53), the area B (54) on the left side of the area A, and the area C (55) on the right side of the area A (53) and letter, number or symbol is inputted by a way (1) pressing the area A (53), a way (2) moving to the area B (54) pressing the area A (53) or a way (3) moving to the area C (55) pressing the area A (53).

In the case of the way (1), letter, number or symbol allocated to the area A (53) is inputted, in the case of the way (2), letter, number or symbol allocated to the area B (54) is inputted and in the case of the way (3), letter, number or symbol allocated to the area C (55) is inputted.

This is an innovative inputting way, unlike the conventional inputting way in which the first and the second reference points are set based on the area pressed by the user for every first time the user press the area. This way contributes not only to the significant improvement of convenience but also to the improvement of the inputting punctuality and inputting speed with simple inputting way.

It means as it is shown in the FIGS. 8-10, the area pressed for the first time by the user becomes the first reference point (50), based on the first reference point (50) on the center, the second reference points (51, 52) are formed on both sides at the same distance from the first reference center and the gap between the two second reference points (51, 52) are partitioned into the area A (53), the area B (54) on the left side of the area A, and the area C (55) on the right side of the area A (53).

Through the partitioning the area, i) in the case of taking the pressing off from the area pressed for the first time, the letter allocated to the area A is inputted (shown in FIG. 8), ii) in the case of moving onto the area B while pressing the area pressed for the first time, the letter allocated to the area B is inputted (shown in FIG. 10), and in the case of moving onto the area C while pressing the area pressed for the first time, the letter allocated to the area C is inputted (shown in FIG. 9).

For example if the letter 'b' is allocated for the area A and 'c' for the area C, and in order to input 'b', the users press any area of the input key and take the pressing off from the pressed area. In order to input 'a', the users keep pressing the first pressed area, the area A, and move to the area B. Also in order to input 'c', the users keep pressing the first pressed area, the area A, and move to the area C.

Preferably, the input key of the first to example 6 of the portable terminal of the present invention is desirable to be consisted of elastic material and the elastic material is desirable to be polyurethanes or silicon. Any material is okay to make input key, however, contrary to the conventional invention, as the sensors built in at the lower part of the input key detect the pressing depending on the location where it is pressed, it is efficient to make the input key with polyurethanes or silicon to improve inputting punctuality and inputting speed of the invention.

Next part is the explanation about letter inputting method by using a portable terminal capable of inputting three signals through one input key of the present invention.

Example 1 of a method for inputting letter of the invention, a portable terminal capable of inputting three signals through one key set of including at least one input key comprises a partitioning (S10) and an inputting (S11).

The partitioning (S10) is the process to set the center of the input button as the reference point and divide the area into the first area on the left side of the reference point and the second area on the right side of the reference point.

The inputting (S11) or symbol by one way of (1) removing pressing on pressed area and the area which is different from the pressed area after pressing one of the first area or the second area, (2) removing pressing on either the first area and the second area after pressing the first area and the second area at the same time, or (3) removing pressing on pressed area after pressing at least one of the first area and the second area.

Here, when inputting using the way (1), letter, number or symbol allocated to the area where pressing is removed are inputted. When inputting using the way (2), letter, number or symbol allocated to the area where pressing is removed are inputted. When inputting using the way (3), letter, number or symbol from letter, number or symbol different from the letter, number or symbol which is allocated to the way (1) and the way (2) are inputted.

Inputting the letter is possible by implementing one of the inputting way (1), the inputting way (2) and the inputting way (3), however for a complete implementation of the invention, the inputting way (1, 2, 3) can be randomly used according to the letter that is inputted. By repeating the inputting (S11), the letter, number or symbol can be inputted continuously.

The detailed implementation method and effect of example 1 of the invention, the portable terminal capable of inputting three signals through one input key is like as shown in example 5 of the portable terminal of the present invention.

Example 2 of a method for inputting letter of the present invention having at least one input key comprises a setting the reference point (S20), a partitioning area (S21), and an inputting letter (S22).

The reference point setting is setting the first reference point and the second reference points, and the first reference point is the place where the input key is pressed first, the second reference points are on the left and right side of the first reference point.

Also, the partitioning area (S21) is partitioning into Area A which is between the second reference points, Area B which is on the left side of the Area A and Area C which is on the right side of the Area A.

The inputting letter (S22) inputs letter, number or symbol by one way of letter inputting (1) moving to the Area B pressing the Area A, letter inputting (2) moving to the Area C pressing the Area A, or letter inputting (3) pressing the Area A.

When using the letter inputting (1), letter, number or symbol allocated to the area B is inputted. When using the letter inputting (2), letter, number or symbol allocated to the area C is inputted and when using the letter inputting (3) letter, number or symbol allocated to the area A is inputted.

Although the setting the reference point (S20), the partitioning area (S21) and the inputting letter (S22) are required processes, letters can be inputted by using at least one of letter inputting ways (1, 2, 3). However, for a complete implementation of the invention, it is desirable to implement all three letter inputting ways and in this case the execution sequence of the letter inputting ways (1, 2, 3) can be changed according to the letter that is inputted. Also by repeating the letter inputting ways (1, 2, 3), the letter, number or symbol can be inputted continuously.

The detailed implementation method and effect of example 2 of a letter inputting method by using a portable terminal of the present invention is like as described in example 6.

INDUSTRIAL APPLICABILITY

A portable terminal capable of inputting three signals by one input key and letter inputting method by using the present invention is set in a way that can input three different letter, number or symbol by pressing one input key one time by using a plurality of sensors for the present invention so that letter can be inputted quickly in small-sized portable terminal and the inputting accuracy significantly increases, which is approved in the industrial applicability.

What is claimed is:

1. A portable terminal capable of inputting three signals by one input key comprising:
   at least one input key, and
   a plurality of sensors sensing electrical signals positioned below the input key;
   wherein a position of the input key pressed for the first time is set as the first reference point, and two second reference points are set on a left and right side at the same distance from the first reference point when the input key is pressed; and
   an area A is between the two second reference points, a left side of the area A is set as an area B, and the right side of the area A is set as an area C, wherein a left one of the two second reference points is on a boundary between the area A and the area B and a right one of the two second reference points is on a boundary between the area A and the area C, and the size of area B and area C is variable depending on the position of the first reference point, one of three different letters, numbers or symbols is allocated to the A area, another of the three different letters, numbers or symbols is allocated to the B area, and the remaining one of the three different letters, numbers, or symbols is allocated to the C area, when the pressing is removed from the A area, the letter, number or symbol allocated to the A area is input, when the pressing is moved to the B area and the pressing is removed from the B area, the letter, number or symbol allocated to the B area is input, and when the pressing is moved to the C area and the pressing is removed from the C area, the letter, number or symbol allocated to the C area is input.

2. The portable terminal capable of inputting three signals by one input key according to claim 1, wherein upper part of the input key is made of elastic material and the elastic material is polyurethane or silicon.

3. A method for inputting three different letters, numbers or symbols using one input key of a portable terminal comprising:

setting a first reference point and two second reference points, the first reference point is the place where the input key is pressed first, the two second reference points are on a left and a right side at the same distance from the first reference point when the input key is pressed;

partitioning area into area A which is between the two second reference points, an area B which is on a left side of the area A and an area C which is on a right side of the area A wherein a left one of the two second reference points is on a boundary between the area A and the area B and a right one of the two second reference points is on a boundary between the area A and the area C, and the size of area B and area C is variable depending on the position of the first reference point; and inputting one of the three different letters, numbers or symbols, the inputting inputs one of the three different letters, numbers or symbols allocated to the A area when the pressing is removed from the A area, inputs another of the three different letters, numbers or symbols allocated to the B area when the pressing is moved to the B area and the pressing is removed from the B area, and inputs the remaining one letter, number or symbol allocated to the C area when the pressing is moved to the C area and the pressing is removed from the C area.

* * * * *